(12) United States Patent
Hayashi (10) Patent No.: US 7,343,646 B2
(45) Date of Patent: Mar. 18, 2008

(54) DAMPER AND DOOR HANDLE HAVING THE SAME

(75) Inventor: Ken Hayashi, Aichi-ken (JP)

(73) Assignee: NIFCO Inc., Yokohama (JP)

( * ) Notice: Subject to any disclaimer, the term of this patent is extended or adjusted under 35 U.S.C. 154(b) by 324 days.

(21) Appl. No.: 11/041,222

(22) Filed: Jan. 25, 2005

(65) Prior Publication Data

US 2005/0160559 A1     Jul. 28, 2005

(30) Foreign Application Priority Data

Jan. 26, 2004     (JP)     ............... 2004-017141

(51) Int. Cl.
E05B 1/00     (2006.01)

(52) U.S. Cl. ............... 16/412; 16/418; 16/54; 188/290

(58) Field of Classification Search ............ 16/50, 16/51, 49, 66, 54, 412, 418; 188/290, 266.3; 292/336.3, 214, 194

See application file for complete search history.

(56) References Cited

U.S. PATENT DOCUMENTS

| | | | |
|---|---|---|---|
| 6,390,255 B2 * | 5/2002 | Kobori et al. | 188/290 |
| 6,725,984 B2 * | 4/2004 | Orita | 188/290 |
| 6,840,355 B2 * | 1/2005 | Iwashita | 188/290 |
| 2002/0007993 A1 | 1/2002 | Kobori et al. | |
| 2002/0179387 A1 | 12/2002 | Orita | |
| 2003/0150678 A1 * | 8/2003 | Iwashita | 188/296 |

FOREIGN PATENT DOCUMENTS

| | | | |
|---|---|---|---|
| EP | 0997869 | | 3/2002 |
| JP | 8-109940 | | 4/1996 |
| JP | 09126265 A | * | 5/1997 |
| JP | 09133170 A | * | 5/1997 |
| JP | 10-208124 | | 8/1998 |
| JP | 2001050326 A | * | 2/2001 |

* cited by examiner

*Primary Examiner*—Chuck Y. Mah
(74) *Attorney, Agent, or Firm*—Manabu Kanesaka

(57) ABSTRACT

A door handle includes a damper wherein a difference in torque changed according to a rotational direction becomes large. A rotor and a valve are completely separated and only the rotor rotates, so that it is possible to significantly reduce torque applied to the rotor. When the rotor and the valve are connected or separated, torque applied to the rotor is changed greatly. Accordingly, instead of gradually changing torque according to a rotational angle of the rotor, it is possible to set a specific point where torque is changed.

6 Claims, 13 Drawing Sheets

DAMPER AND DOOR HANDLE HAVING THE SAME

BACKGROUND OF THE INVENTION AND RELATED ART STATEMENT

The present invention relates to a damper and a door handle provided with the damper.

Figure 12:
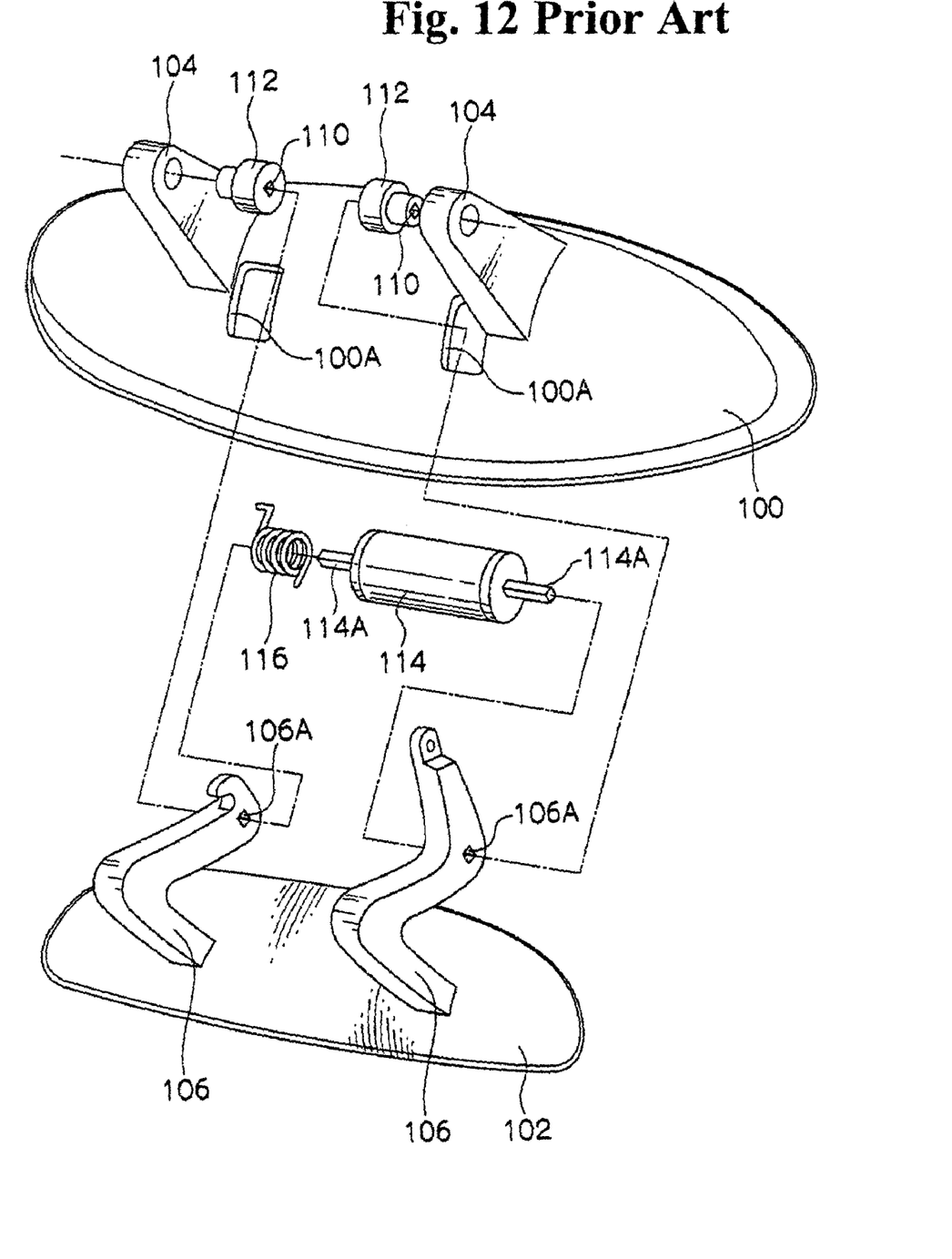
FIG. 12 is an exploded perspective view of a conventional damper.

Patent Document 1 discloses a damper for generating high torque as shown in FIG. 12, in which through holes 100A are formed in a seat metal plate 100 of an automobile door panel. A pair of pivot arms 106 as a crank member is provided on a backside of an operation handle 102 to be provided on a front side of the seat metal plate 100, so that the pivot arms 106 can be inserted into the through holes 100A.

A pair of projections 104 projects from a backside of the seat metal plate 100. The pivot arms 106 are arranged inside the projections 104 in a state adjacent to the projections 104. Bearing parts 112 with axle holes 110 having a square cross section are rotatably attached to the projections 104.

A cylinder shaped damper 114 has rotation axes 114A with a rectangular shape projecting from both ends thereof for engaging the axle holes 110 and short holes 106A formed in the projections 106, so that the cylinder shaped damper 114 can rotate together with the pivot arms 106.

Accordingly, when the operating handle 102 is pulled to rotate the pivot arms 106 counterclockwise, the bearing parts 112 rotate relative to the projections 104, so that the rotation axes 114A stir viscous fluid in the damper 114, thereby applying torque to the operation handle 102.

A spring 110 is attached to the rotation axes 114 for urging the pivot arms 106 clockwise. When the operation handle 102 rotates clockwise, the torque applied to the operation handle 102 is reduced.

In Patent Document 1, the spring 116 reduces the torque applied to the operation handle 102 only when the operation handle 102 rotates clockwise. The damper 114 does not have a structure for changing torque according to a rotational direction of the operation handle 102.

Figure 13:
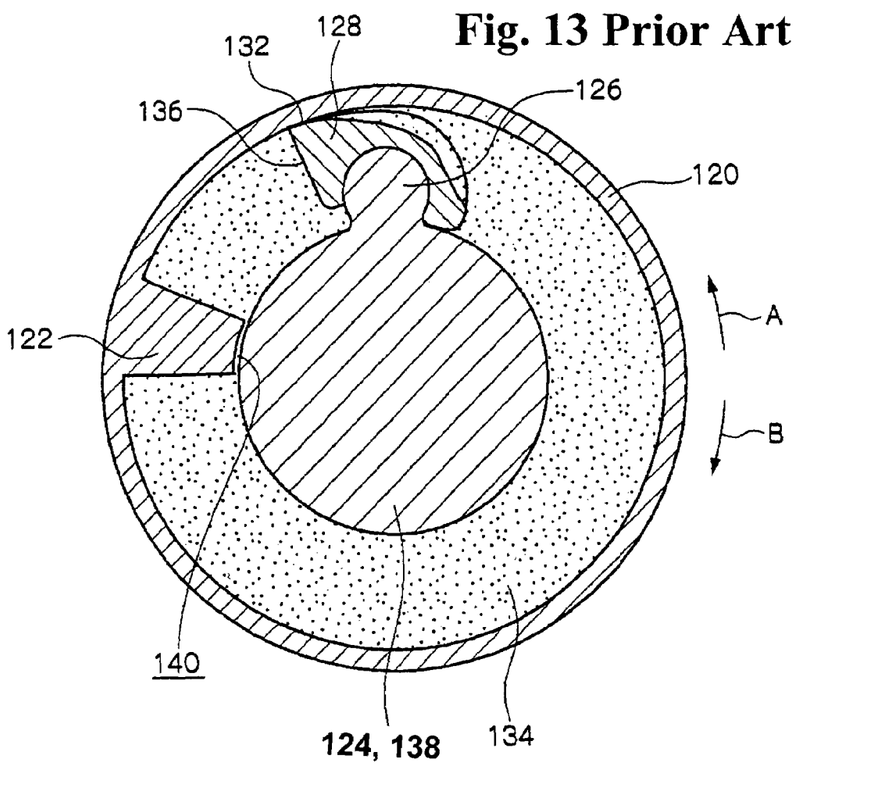
FIG. 13 is an exploded perspective view of another conventional damper.

In Patent Document 2, as shown in FIG. 13, a projection 122 projects from an inner circumference surface of a casing 120 filled with viscous fluid. A rotation member 124 is rotatably supported in the casing 120.

A supporting projection 126 projects from an outside circumference surface of the rotation member 124 along an axial direction of the rotation member 124. A movable valve 128 is retained on a surface of the supporting projection 126 to be movable along a circumferential direction of the casing 120.

When the rotation member 124 rotates in an arrow direction A (counterclockwise), the movable valve 128 receives resistance due to viscous fluid and rotates in a direction opposite to the arrow direction A around the supporting projection 126. A fluid blocking surface 132 at a tip of the movable valve 128 closely contacts an inner surface of the casing 120. Accordingly, a flat portion 136 of the movable valve 128 pushes viscous fluid 134 to flow between the projection 122 and an axial portion 138, thereby generating high torque.

On the other hand, when the rotation member 124 rotates in an arrow direction B, the movable valve 128 receives resistance due to viscous fluid 134 and rotates in a direction opposite to the arrow direction B. The fluid blocking surface 132 of the movable valve 128 moves away from the inner surface of the casing 120. Accordingly, a fluid chamber inside the casing 120 and divided by the movable valve 128 becomes a communicating state. As a result, viscous fluid 134 flows, thereby generating no damping effect.

In Patent Document 2, viscous fluid 134 flows through the space 140 between the projection 122 and the axial portion 138 regardless of the rotational direction of the axial portion 138. Accordingly, viscous fluid 134 flows through the space 140 in both directions to apply at least shear resistance to the axial portion 138. Therefore, the damper effect is somehow generated when the rotation member 124 rotates in the arrow direction B.

Figure 14:
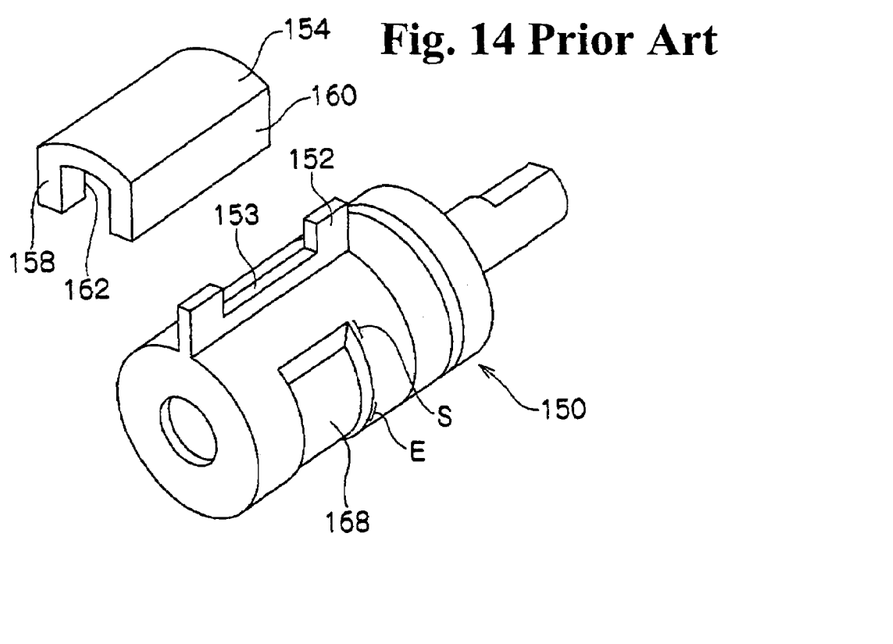
FIG. 14 is an exploded perspective view of a further conventional damper.

In Patent Document 3, a convex portion 152 projects from an outer circumference surface of a rotation member 150 along an axial direction, and a notch 153 is provided at a middle of the convex portion 152 in the axial direction. A valve member 154 engages the convex portion 152, so that the rotation member 150 rotates with a small gap between an outer circumference portion of the rotation member 150 and an inner circumference surface of a casing.

The valve member 154 has vertical walls 158 and 160 at left and right sides, and a notch 162 is formed in the vertical wall 158 along the axial direction. When the rotation member 124 rotates toward the vertical wall 158, a by-path passage of viscous fluid is formed from the notch 162 to the notch 153, thereby reducing torque.

On the other hand, when the rotation member 124 rotates toward the vertical wall 160, the by-path passage of viscous fluid is not formed. Viscous fluid flows only through a space between an upper surface of the valve member 154 and the inner circumference of the casing, and a space between a projection on the inner circumference of the casing and the outer circumference of the rotation member 150, thereby generating large rotational resistance and increasing torque.

A groove 168 is provided at a center of the outer circumference of the rotation member 150 in a circumferential direction. The groove 168 has a constant width and is formed to become deeper from a start area S toward an end area E.

Accordingly, a by-path passage of viscous fluid is formed between an upper surface of the projection and the groove 168. When the rotation member 150 rotates and the start end S faces the upper surface of the projection, the by-path passage has a small cross section in the axial direction, thereby generating high torque. When the end area E faces the upper surface of the projection 166, small torque is generated.

In Patent Document 3, the rotation member 150 and the valve member 154 always rotate together. Accordingly, the by-path passage of viscous fluid is formed between the upper surface of the projection and the groove 168, thereby reducing torque generated on the rotation member 150. However, as compared with a case that only the rotation member 150 rotates, extra torque is generated on the rotation member 150 by an amount of engaging the valve-member 154.

Patent Document 1: U.S. Pat. No. 5,743,575
Patent Document 2: Japanese Patent Publication (Kokai) No. 10-208124
Patent Document 3: Japanese Patent Publication (Kokai) No. 8-109940

In view of the problems described above, an object of the present invention is to provide a damper and a door handle having the damper, in which it is possible to increase a difference in torque according to a rotational direction.

Further objects and advantages of the invention will be apparent from the following description of the invention.

SUMMARY OF THE INVENTION

According to a first aspect of the present invention, a damper includes a housing with a cylindrical shape filled with viscous fluid; a rotor rotatably disposed in the housing for receiving a rotational force from outside; a valve detachable to the rotor for changing torque applied to the rotor; and a connecting/separating device for connecting and separating the valve relative to the rotor according to a rotational angle of the rotor.

In the first aspect of the present invention, the rotor is rotatably disposed in the housing filled with viscous fluid. The rotor receives the rotational force from outside, and the valve is provided to be detachable to the rotor. The connecting/separating device connects or separates the valve relative to the rotor according to a rotational angle of the rotor, so that torque applied to the rotor is changed.

The rotor and the valve are connected or completely separated from each other, thereby reliably changing torque. That is, in a state that the rotor and the valve are connected, viscous fluid passes through a gap between an inner surface of the housing and an outer surface of the valve. In a state that the rotor and the valve are separated, viscous fluid passes through a gap between the inner surface of the housing and an outer surface of the rotor. Accordingly, the rotor and the valve are connected or completely separated from each other, so that shear resistance applied to the rotor is changed significantly.

The rotor is completely separated from the valve and only the rotor rotates, thereby significantly reducing torque applied to the rotor. When the rotor and the valve are connected or separated, torque applied to the rotor is greatly changed. Accordingly, instead of gradually changing torque according to a rotational angle, it is possible to set a specific point where torque is changed.

According to a second aspect of the present invention, in the damper in the first aspect, the connecting/separating device is formed of a hook formed on an outer surface of the rotor; a step formed in the valve for engaging the hook; a pin formed on the valve; a guide groove formed in the housing for guiding the pin so that the step engages the hook and the hook pushes the valve to release the step; and a stopper formed in the guide groove for restricting a movement of the pin.

In the second aspect of the present invention, the hook is provided on the outer surface of the rotor, and the step for engaging the hook and the pin are provided on the valve. The guide groove is provided in the housing for guiding the pin, so that the step engages the hook, and the hook pushes the valve to release the step form the hook.

The stopper is provided in the guide groove for restricting the movement of the pin. When the rotor rotates further in a state that the step is released from the hook, a movement of the valve is restricted through the pin, so that only the rotor rotates, thereby completely separating the rotor from the valve.

According to a third aspect of the present invention, in the damper in one of the first and second aspect, a hole is formed at a center of the valve, and a groove is provided for communicating with the hole when the rotor rotates in one direction in a state that the rotor is connected to the valve.

In the third aspect of the present invention, the hole is formed at the center of the valve, and the groove is provided in the hook of the rotor. The hole communicates with the groove when the rotor rotates in one direction in a state that the rotor is connected to the valve.

When the rotor rotates, the hook pushes viscous fluid. The groove of the hook communicates with the hole of the valve when the rotor rotates in one direction. Accordingly, viscous fluid pushed by the hook can flow from the groove to the hole, thereby reducing torque applied to the rotor.

When the rotor rotates in the other direction, the hole of the valve does not communicate with the groove of the hook.

Accordingly, viscous fluid pushed by the hook does not flow to the hole, thereby increasing torque applied to the rotor.

That is, the torque can be changed greatly according to a rotational direction of the rotor, thereby obtaining a one-way type damper.

According to a fourth aspect of the present invention, in the damper in one of the first to third aspects, a distance between the outer surface of the valve and the inner surface of the housing is changed according to a position of the rotor in a circumference direction in a state that the valve is connected to the rotor.

In the fourth aspect of the present invention, the distance between the outer surface of the valve and the inner surface of the housing is changed according to the position of the rotor in the circumference direction in a state that the valve is connected to the rotor. Accordingly, when the hook of the rotor pushes the valve, it is possible to press the valve against the housing in a state inclined relative to the circumference direction of the rotor, thereby making it easy to release the step of the valve from the hook.

According to a fifth aspect of the present invention, a door handle has the damper in one of the first to fourth aspects.

In the fifth aspect of the present invention, the door handle is provided with the damper. Accordingly, when the door is opened, it is possible to rotate an operation handle with a small force to open the door. When a hand is released from the handle, the operation handle quietly returns to an original position, thereby providing high quality feeling.

According to a sixth aspect of the present invention, a door handle of an automobile includes an arm rotatable around a fixed axis of a door panel of an automobile; an operation handle provided on one side of the arm; a first gear mounted on the fixed axis; a second gear mounted on the other side of the arm and formed of teeth having a number less than that of the first gear for transmitting a rotational force through the first gear attached to a rotational axis of the arm; and a rotor of a damper attached to a rotational axis of the second gear.

In the sixth aspect of the present invention, the arm is mounted to be rotatable around the fixed axis of the door panel, and the operation handle is provided on the other side of the arm. The first gear is mounted on the fixed axis, and engages the second gear formed of teeth having a number less than that of the first gear. When the arm rotates, a rotational force is transmitted to the second gear through the first gear. The rotor of the damper is connected with the rotational axis of the second gear.

In the first gear and second gear, the second gear is formed of teeth having a number less than that of the first gear, so that an angle speed of the second gear becomes greater than an angle speed of the first gear. Accordingly, it is possible to rotate the rotor in a larger extent, thereby utilizing damper effect effectively.

That is, when the operation handle rotates, torque applied to the rotor becomes small, thereby rotating the operation handle with a small force. When a hand is released form the operation handle, the torque applied to the handle increases, thereby returning the operation handle quietly and providing high quality feeling.

The first gear and the second gear are formed as individual members attached to the fixed axis or the arm, respectively. Accordingly, it is possible to freely arrange the first gear and the second gear according to a function without restriction.

According to a seventh aspect of the present invention, the door handle in the sixth aspect is provided with the damper in one of the first to fourth aspects.

In the seventh aspect of the present invention, the door handle in the sixth aspect is provided with the damper in one of the first to fourth aspects, thereby obtaining an effect in the first to fourth aspects.

According to an eighth aspect of the present invention, in the door handle in one of the fifth to seventh aspects, a weight having a weight same as that of the operation handle of the door handle is provided coaxially with the damper.

In the eighth aspect of the present invention, the weight having a weight same as that of the operation handle of the door handle is provided coaxially with the damper, thereby preventing the operation handle from opening toward outside automatically.

In the first and second aspects of the present invention, with the structure described above, the rotor and the valve are connected and separated with each other, thereby changing torque applied to the rotor. When the rotor is completely separated from the valve, and only the rotor rotates, it is possible to significantly reduce torque applied to the rotor. When the rotor and the valve are connected or separated, torque applied to the rotor is changed significantly. Accordingly, instead of gradually changing torque according to a rotational angle, it is possible to set a specific point where torque is changed.

In the third aspect of the present invention, it is possible to significantly change torque according to the rotational direction of the rotor, thereby obtaining a one-way type damper.

In the fourth aspect of the present invention, when the hook of the rotor pushes the valve, the valve is pressed against the housing in an inclined state relative to the circumferential direction of the rotor, thereby making it easy to release the step of the valve from the hook.

In the fifth aspect of the present invention, the door handle is provided with the damper. Accordingly, when the door is opened, it is possible to rotate the operation handle with a small force to open the door. When a hand is released from the handle, the operation handle quietly returns to an original position, thereby providing high quality feeling.

In the sixth aspect of the present invention, in the first gear and second gear, the second gear is formed of teeth having a number less than that of the first gear, so that an angle speed of the second gear becomes greater than an angle speed of the first gear. Accordingly, it is possible to rotate the rotor in a larger extent, thereby utilizing damper effect effectively. That is, when the operation handle rotates, torque applied to the rotor becomes small, thereby rotating the operation handle with a small force. When a hand is released form the operation handle, torque applied to the handle increases, thereby returning the operation handle quietly and providing high quality feeling. The first gear and the second gear are formed as individual members attached to the fixed axis or the arm, respectively. Accordingly, it is possible to freely arrange the first gear and the second gear according to a function without restriction.

In the seventh aspect of the present invention, it is possible to obtain the effect of the first to fourth aspects in the door handle.

In the eighth aspect of the present invention, the weight having a weight same as that of the operation handle of the door handle is provided coaxially with the damper, thereby preventing the operation handle from opening toward outside automatically.

DETAILED DESCRIPTION OF PREFERRED EMBODIMENTS

Hereunder, a structure and operation of the present invention will be described in detail with reference to the attached drawings.

Figure 1:
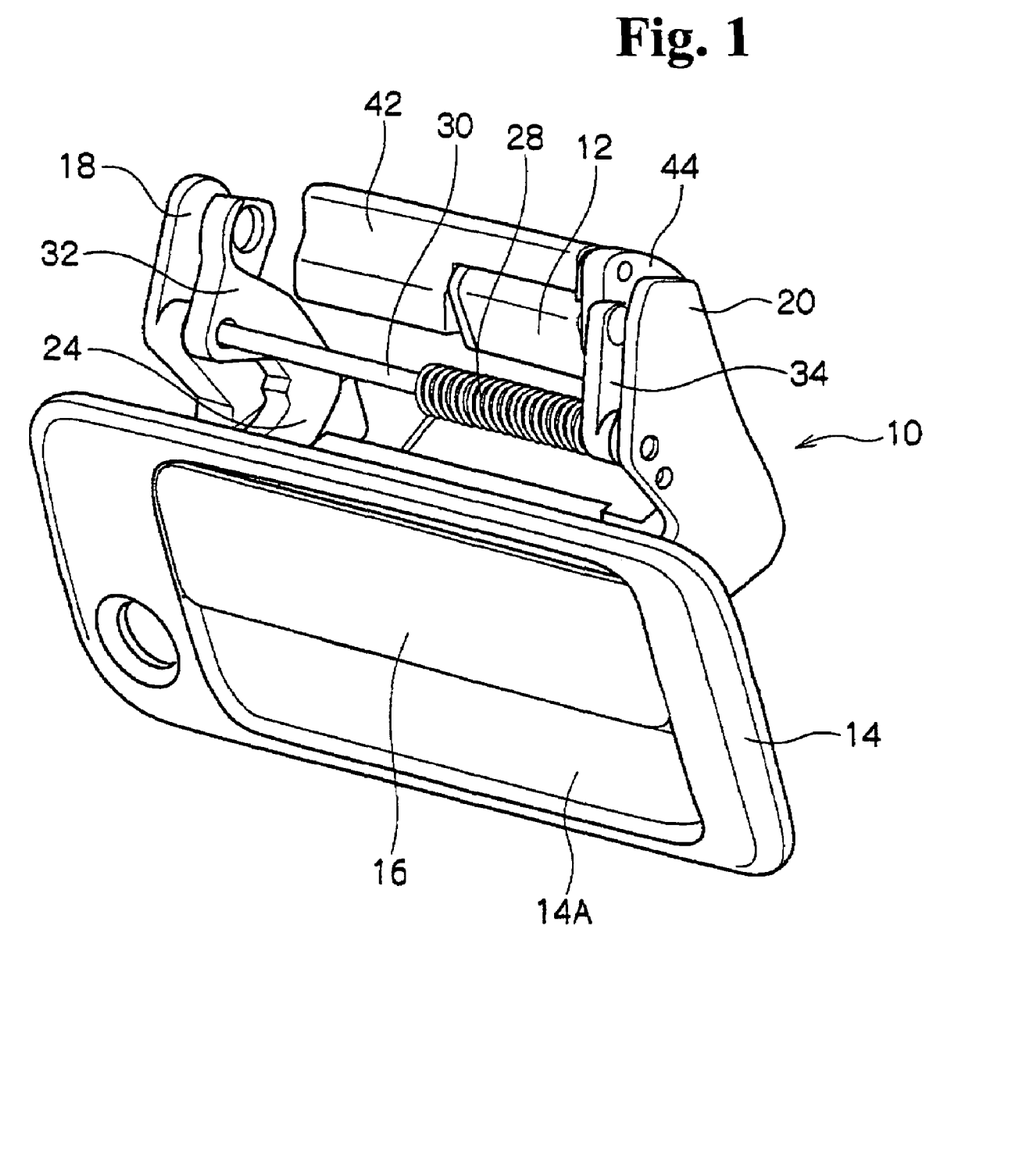
FIG. 1 is a perspective view of a door handle with a damper according to an embodiment of the present invention in a closed state.
Figure 2:
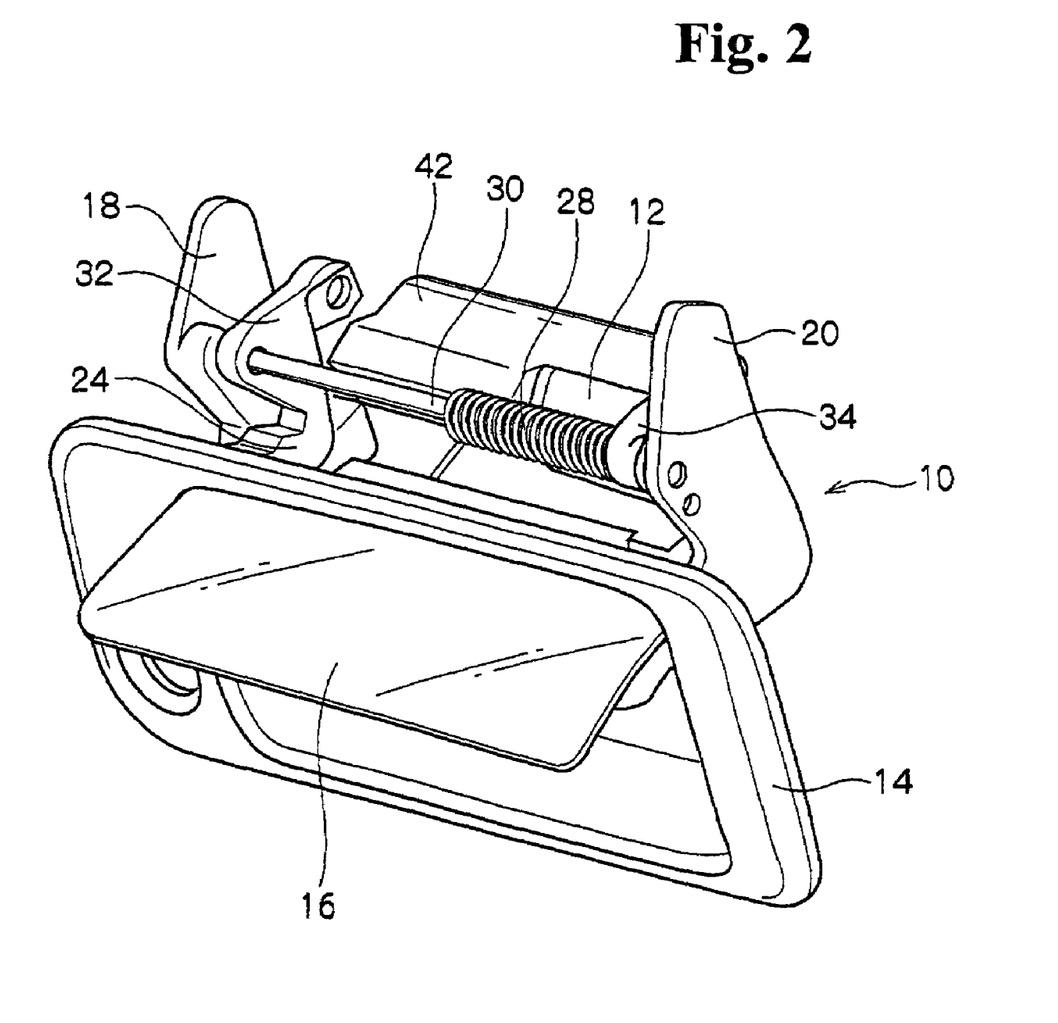
FIG. 2 is a perspective view of the door handle with the damper according to the embodiment of the present invention in a rotating state.
Figure 3:
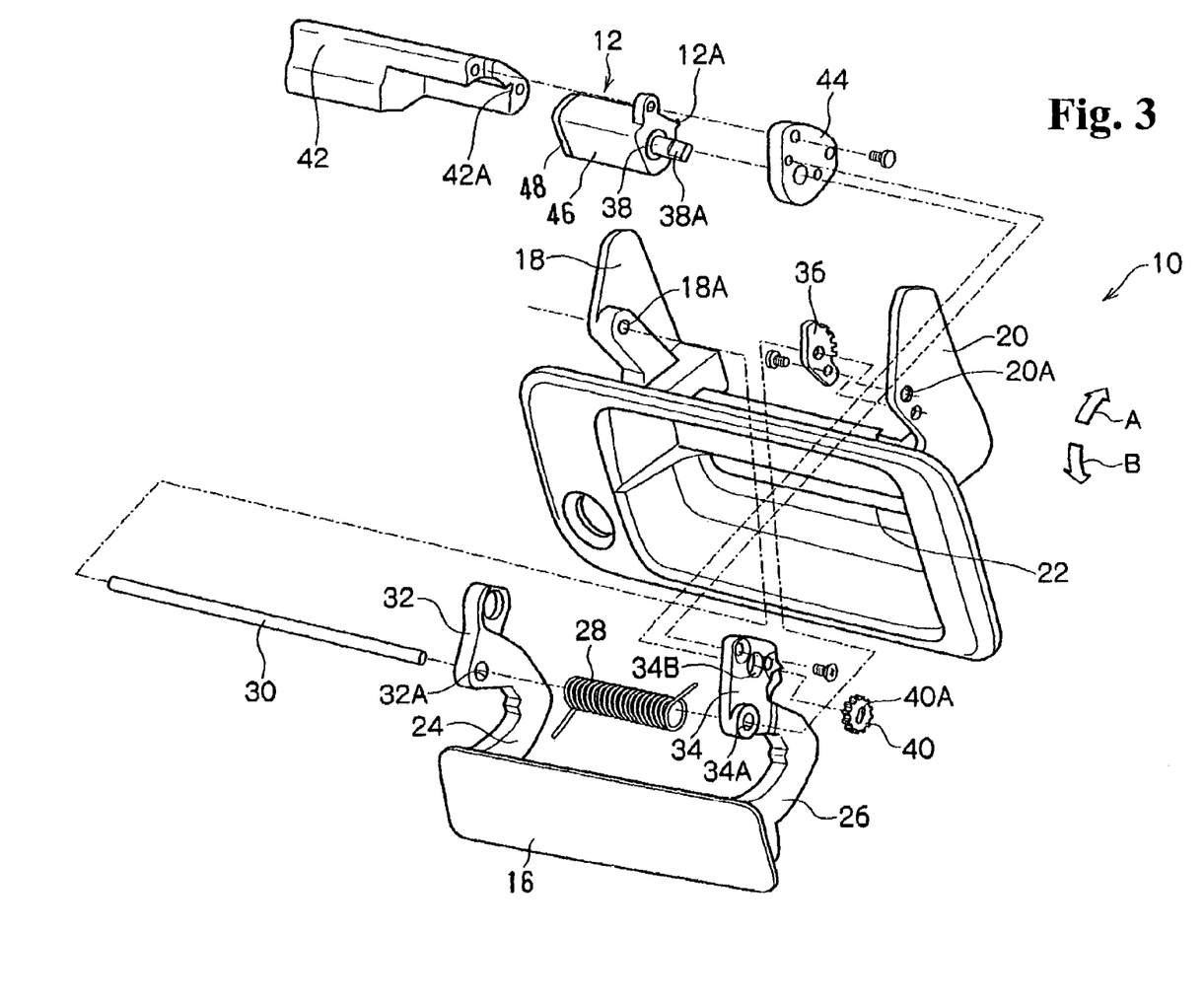
FIG. 3 is an exploded perspective view of the door handle with the damper according to the embodiment of the present invention.

As shown in FIGS. 1 to 3, a door portion of an automobile is provided with a door handle 10 for opening and closing the door. A damper 12 according to an embodiment of the present invention is applied to the door handle 10.

The door handle 10 is roughly divided into a main part 14 and an operation handle 16. The main part 14 is fixed to a vehicle panel, and the operation handle 16 is arranged to be rotatable relative to the main part 14.

A pair of locking pieces 18 and 20 projects from a backside of the main part 14, and is fixed to the vehicle panel. A recess part 14A is formed in the main part 14 for retaining the operation handle 16. An opening 22 is formed in the recess part 14A, and a pair of arms 24 and 26 projecting from a backside of the operation handle 16 can be inserted into the opening 22.

A hole 18A is formed in the locking piece 18, and a hole 20A is formed in the locking piece 20. A shaft 30 with a coil spring 28 is fixed to the locking pieces 18 and 20. Axis panels 32 and 33 are disposed on edges of the arms 24 and 26. The shaft 30 is inserted into holes 32A and 34A formed in the axis panels 32 and 34, so that the operation handle 16 and the arm 24 and 26 are rotatable around the shaft 30.

A sector gear 36 is provided outside the arm 26. The shaft 30 is inserted through the middle of the sector gear 36, and fixed to the locking piece 20 at a position shifted from a center of the sector gear 36.

An insertion hole 34B is formed in the axis panel 34, and a rotational axis 38 of the damper 12 is rotatably supported thereon. A tip of the rotational axis 38 is provided with a key portion 38 with cut opposed faces. A gear 40 is provided on the key portion 38A for engaging the sector gear 36 with the axis panel 34 in between, and has a hole 40A at a center thereof corresponding to the key portion 38A.

The damper 12 is fixed to counter weights 42 and 44. A total weight of the counter weights 42 and 44 is same as that of the operation handle 16.

A recess part 42A is provided in the counter weight 42 for engaging a projection 12A projecting from an outer surface of the damper 12 along an axis direction. In a state that the projection 12A engages the recess part 42A, the damper 12 is fixed to the counter weight 42, so that a housing 46 of the damper 12 does not rotate. The counter weight 44 is inserted through the rotational axis 38 and fixed to the damper 12.

Figure 4:
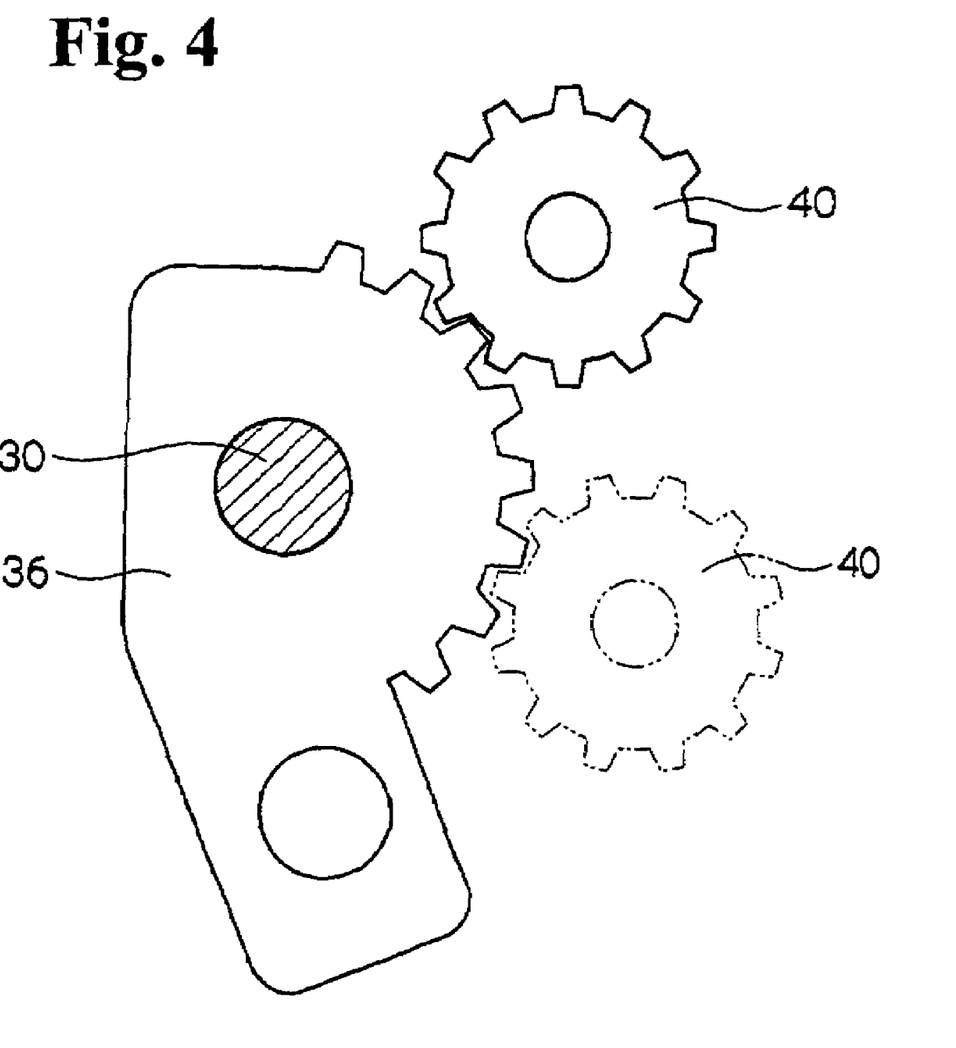
FIG. 4 is a schematic view showing a relationship between a sector gear and a gear of the door handle with the damper according to the embodiment of the present invention.

With the structure described above, when the operation handle 16 rotates, the arms 24 and 26 rotate around the shaft 30, and the gear 40 fixed to the axis panel 34 of the arm 26 rotates around the shaft 30. The gear 40 engages the sector gear 36, so that the gear 40 rotates around the sector gear 36 and rotates around its own axis. Accordingly, the rotational axis 38 of the damper 12 connected to the gear 40 rotates.

One end of the coil spring 28 is fixed to the main part 14, and the other end of the coil spring 28 is fixed to the axis panel 34 of the arm 26. Accordingly, when the operation handle 16 rotates, the arm 26 rotates to accumulate elasticity in the coil spring 28.

When the operation handle 16 rotates and a hand is released, the operation handle 16 returns to an original position with the restoring force of the coil spring 28, thereby rotating the rotational axis 38 of the damper 12 through the gear 40.

The damper 12 according to an embodiment of the present invention will be described next.

Figure 7A:
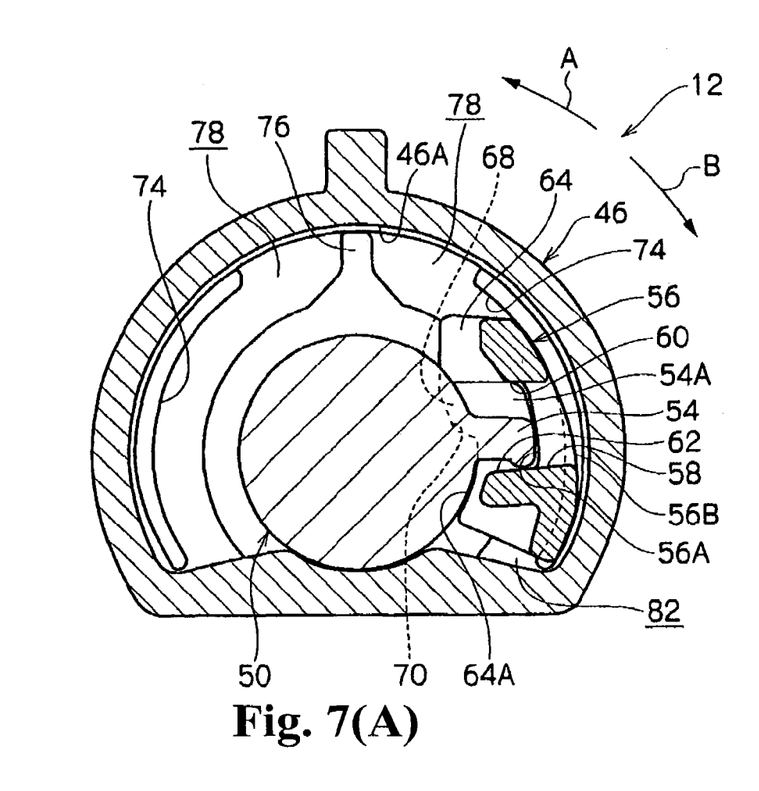
FIG. 7(A) is a sectional view of the rotor and the valve in the connected state.
Figure 7B:
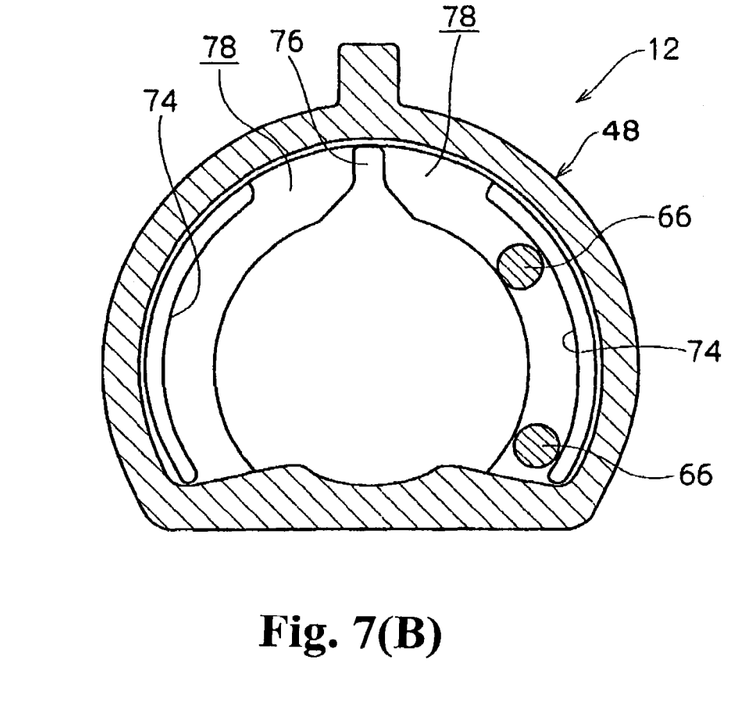
FIG. 7(B) is a sectional view showing a relationship between a guide groove formed in a cap and a pin of the valve.

As shown in FIGS. 5 to 7(A) and 7(B), the damper 12 has a housing 46 with a partially cut cylindrical shape, and is closed with a cap 48. (Incidentally, FIG. 7(A) is a sectional view of a rotor 50 and a valve 56 in a connected state, and FIG. 7(B) is a sectional view showing a relationship between a guide groove 74 formed in the cap 48 and a pin 66 of the valve 56. FIGS. 8(A), 8(B), 10(A), 10(B), 11(A), 11(B) are the same.) The housing 46 is filled with viscous fluid such as silicon oil, and a hole 45 is formed in a bottom surface of the-housing 46 at a center thereof.

Figure 5:
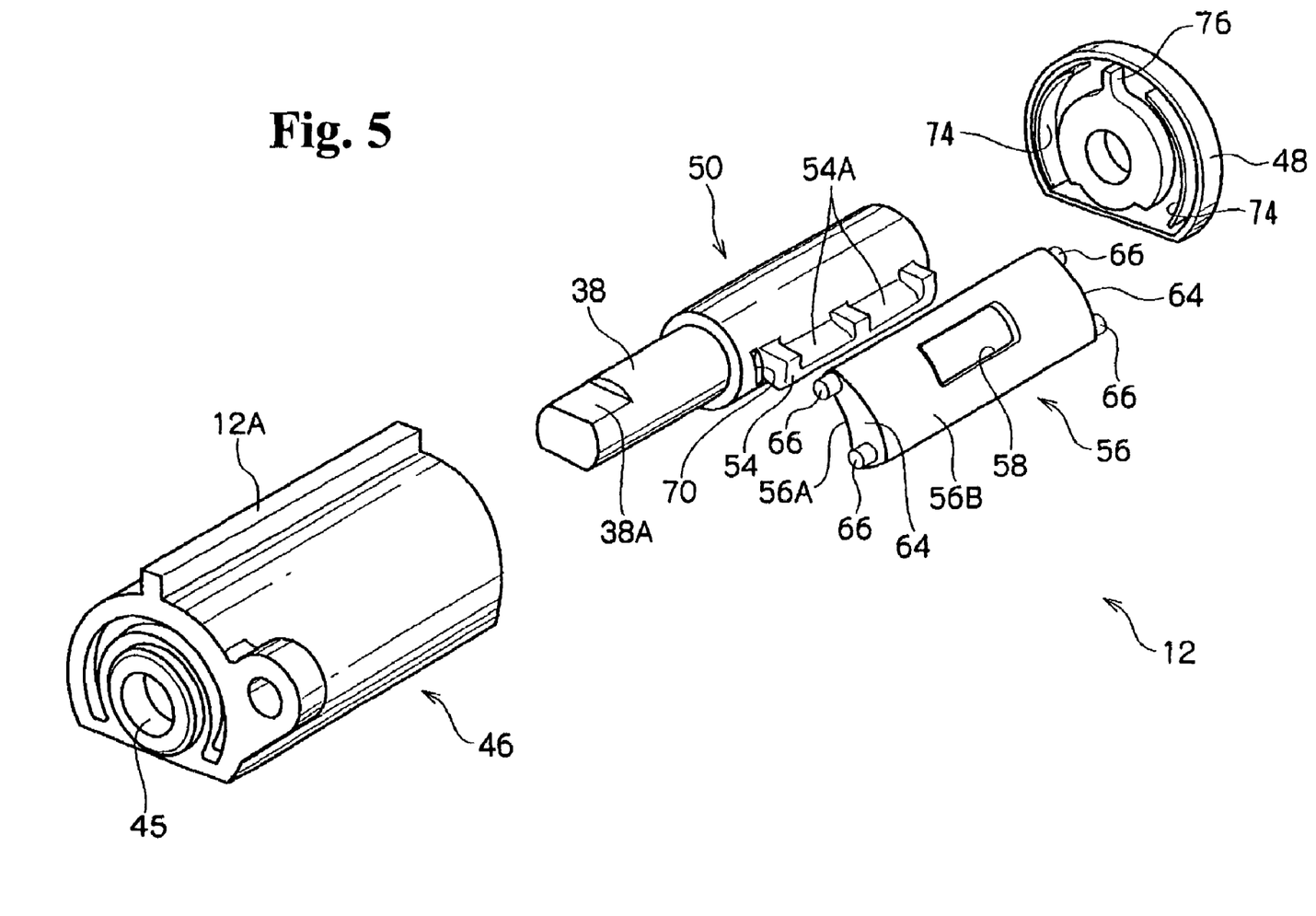
FIG. 5 is an exploded perspective view of the damper according to the embodiment of the present invention.

A rotational axis 38 of the rotor 50 formed in a cylindrical shape can be inserted through the hole 45. An O-ring (not shown) is mounted at a base of the rotational axis 38 for sealing between the rotational axis 38 and the hole 45, thereby preventing viscous fluid from leaking.

An angular shape hook 54 projects on an outer surface of the rotor 50 along an axial direction of the rotor 50. The hook 54 is provided with two grooves 54A in one of sidewalls thereof along a longitudinal direction.

The valve 56 can engage the hook 54. The valve 56 is formed in a flat panel, and a short hole 58 is formed at a center of the valve 56 along the longitudinal direction. The valve 56 has a curved inner surface 56A and a curved outer surface 56B. Steps 60 and 62 are formed in the inner surface 56A of the valve 56 along with the longitudinal direction, and the step 62 is higher than the step 60.

Seats 64 are formed on both ends of the valve 56 in a width direction between the steps 60 and 62 at outside the seats 64. A pair of pins 66 projects from an outer surface of each of the seats 64 along with the axial direction of the valve 56.

A lock piece 68 projects from an inner surface of each of the seats 64 for engaging an engaging part 70 formed in an end of the hook 54 of the rotor 50 along the circumferential direction of the rotor 50. When the lock piece 68 of the valve 56 engages the engaging part 70 of the hook 54, the rotor 50 is connected to the valve 56. In this state, the grooves 54A of the hook 54 of the rotor 50 communicate with the short hole 58 of the valve 56.

Contact surfaces 64A are formed on the seats 64, and have a curvature radius substantially same as that of the outer surface of the rotor 50. In the state that the rotor 50 and the valve 56 are connected, the contact surfaces 64A can contact the outer surface of the rotor 50. Also, in the state that the rotor 50 and the valve 56 are connected, a distance between the outer surface 56B of the valve 56 and the inner surface 46A of the housing 46 changes along the circumferential direction of the housing 46A.

The guide grooves 74 are formed in bottom surfaces of the housing 46 and the cap 48 symmetrically at left and right sides, respectively, so that the pins 66 of the valve 56 can engage. (FIGS. 7(A) and 7(B) show the guide grooves 74 formed in the bottom surface of the cap 48. FIGS. 8(A), 8(B), 10(A), 10(B), 11(A), 11(B) are the same.)

The guide grooves 74 are formed on a concentric circle of the rotor 50 in a state that the rotor 50 is retained in the housing 46, and guide the valve 56 through the pins 66. A stopper 76 is provided at a center of the guide grooves 74 at the left and right sides for restricting a movement of the pins 66 (see FIG. 11(B)). The guide grooves 74 are cut off to form wide parts 78 adjacent to the stopper 76, thereby providing a play for the pins 66.

An operation of the damper 12 according to the embodiment of the present invention will be described next with reference to FIG. 3.

Figure 6:
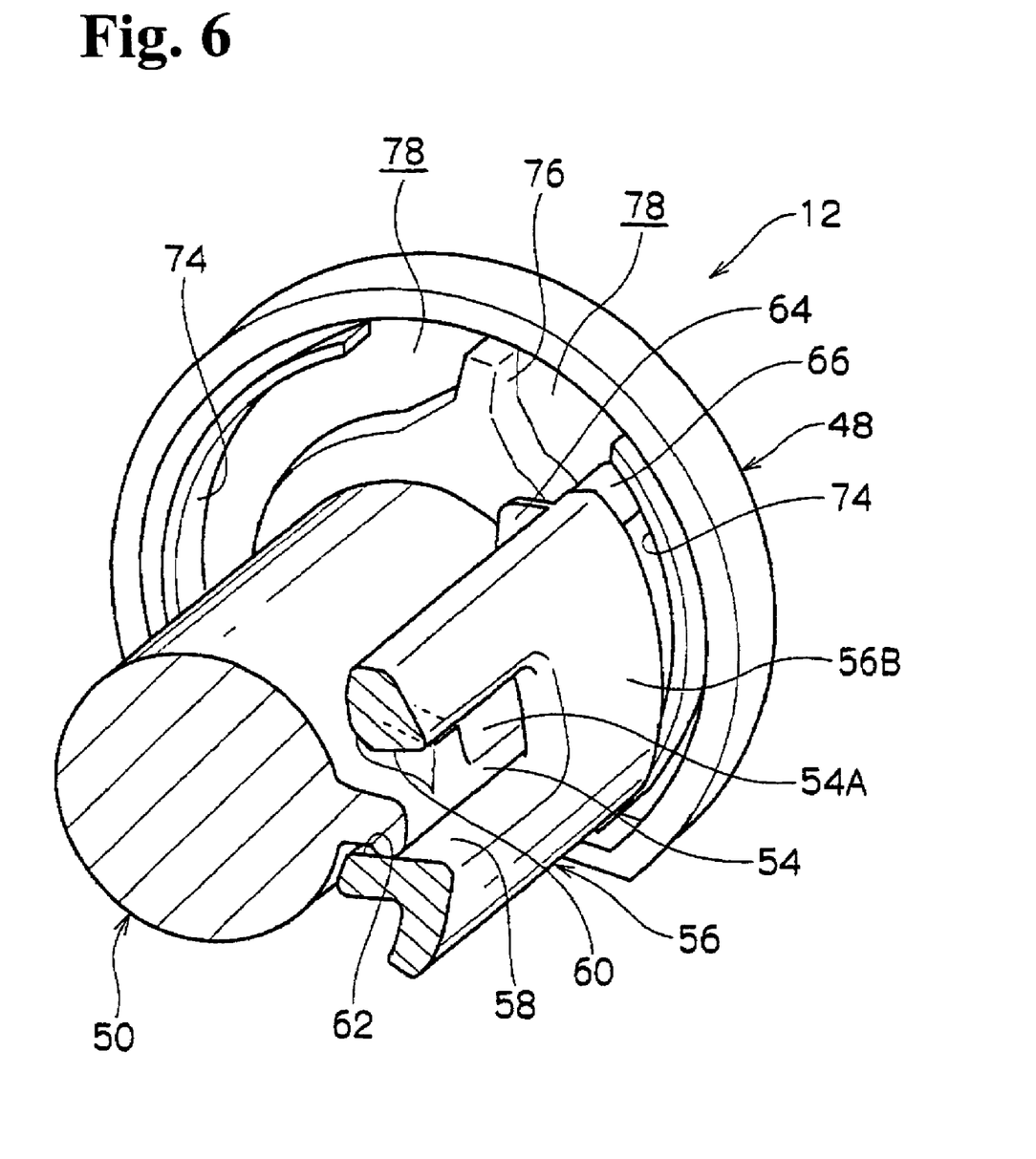
FIG. 6 is a perspective view of a rotor and a valve of the damper according to the embodiment of the present invention in a connected state.

FIG. 6 and FIGS. 7(A) and 7(B) show a state that the operation handle 16 is closed. The engaging parts 70 of the hook 54 engage the lock pieces 68 of the valve 56, and the valve 56 is connected to the rotor 50, so that the rotor 50 rotates together with the valve 56.

In this state, when the operation handle 16 rotates, the arms 24 and 26 rotate, and the gear 40 rotates around the sector gear 36. The gear 40 also rotates around its own axis through the sector gear 36, and the rotor 50 rotates in the arrow direction A through the rotational axis 38.

The grooves 54A of the hook 54 of the rotor 50 extend in the arrow direction A. When the rotor 50 rotates in the arrow direction A, viscous fluid pushed by the hook 54 flows to the short hole 58 of the valve 56 from the grooves 54A of the hook 54. Accordingly, when the rotor 50 rotates in the arrow direction A, it is possible to reduce resistance of viscous fluid, thereby reducing torque applied to the rotor 50.

Figure 8A:
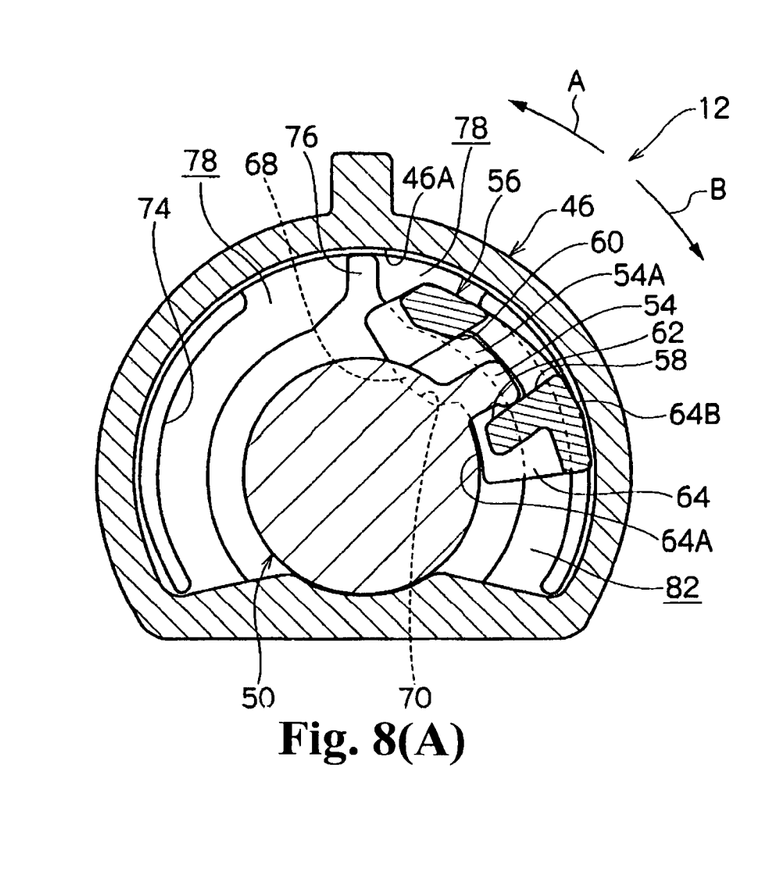
FIG. 8(A) is a sectional view of the rotor and the valve in the connected state.
Figure 8B:
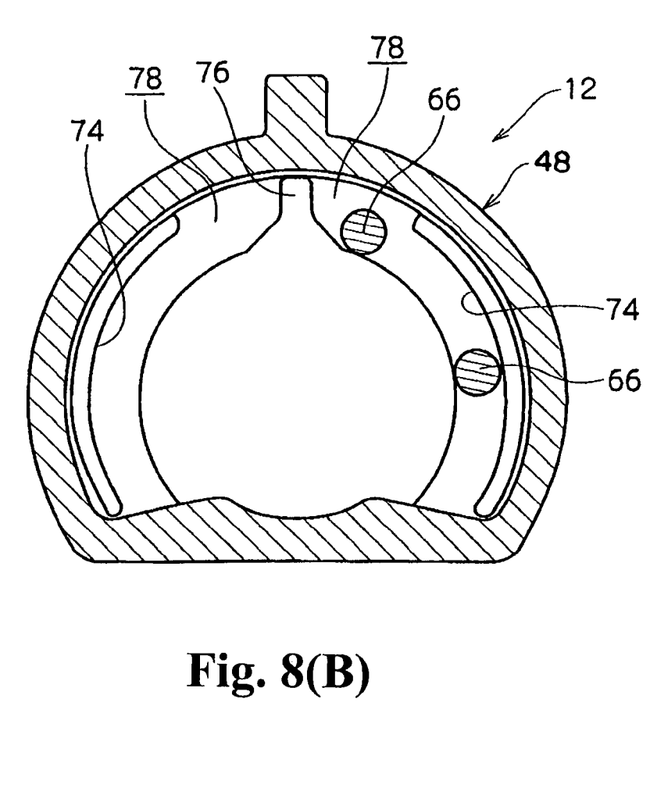
FIG. 8(B) is a sectional view showing a relationship between a guide groove formed in a cap and a pin of the valve.

As shown in FIGS. 8(A) and 8(B), when the pins 66 of the valve 56 reach the wide parts 78 of the guide groves 74, the pins 66 have a large play, so that the valve 56 can rotate around the pins 66 not reaching the wide parts 78.

In the state that the rotor 50 and the valve 56 are connected, the distance between the inner surface 46A of the housing 46 and the outer surface 56B of the valve 56 changes according to a position of the valve 56 in the width direction. That is, the distance between the inner surface 46A of the housing 46 and the outer surface 56B of the valve 56 gradually increases toward the arrow direction A.

Figure 9:
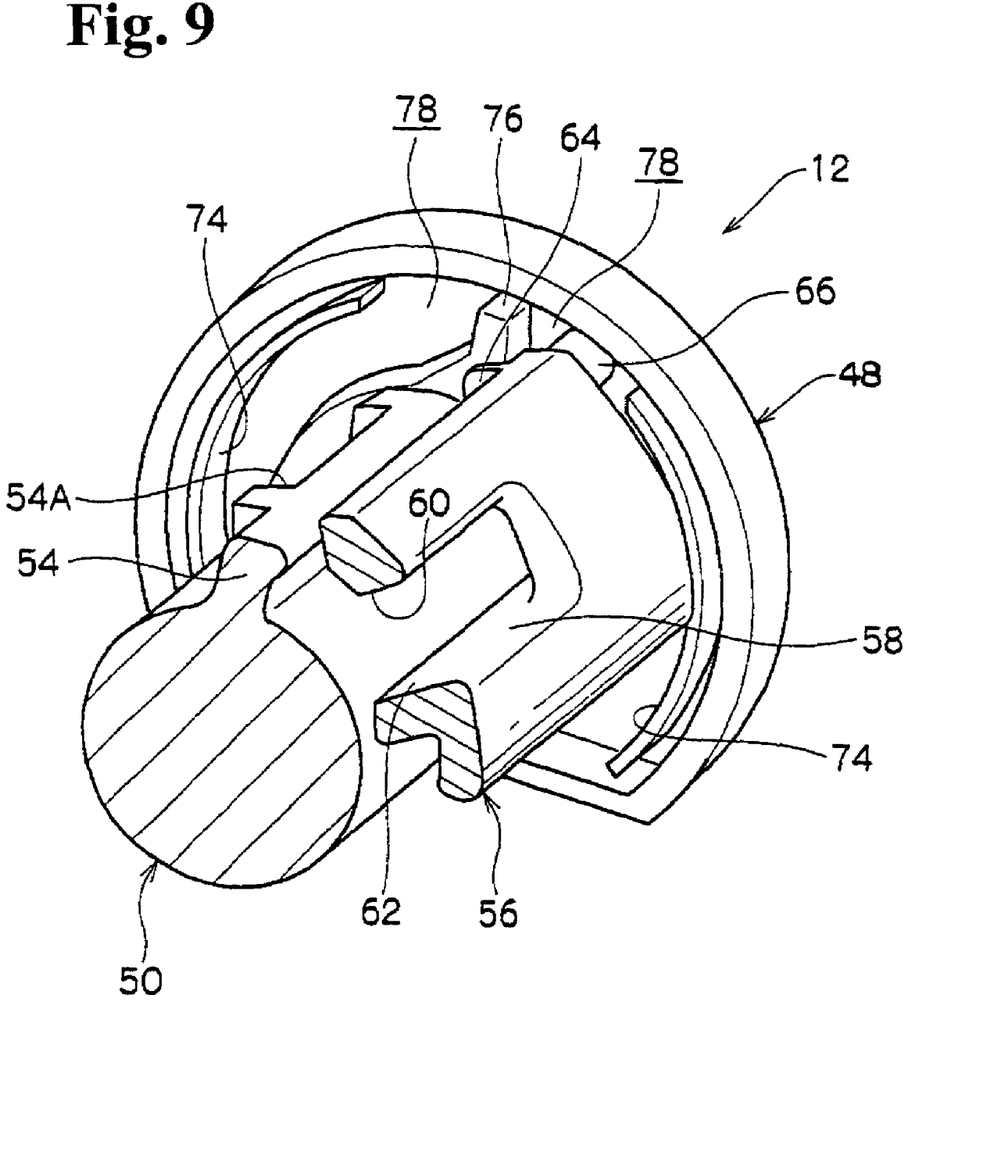
FIG. 9 is a perspective view of the rotor and the valve of the damper according to the embodiment of the present invention in a separated condition.
Figure 10A:
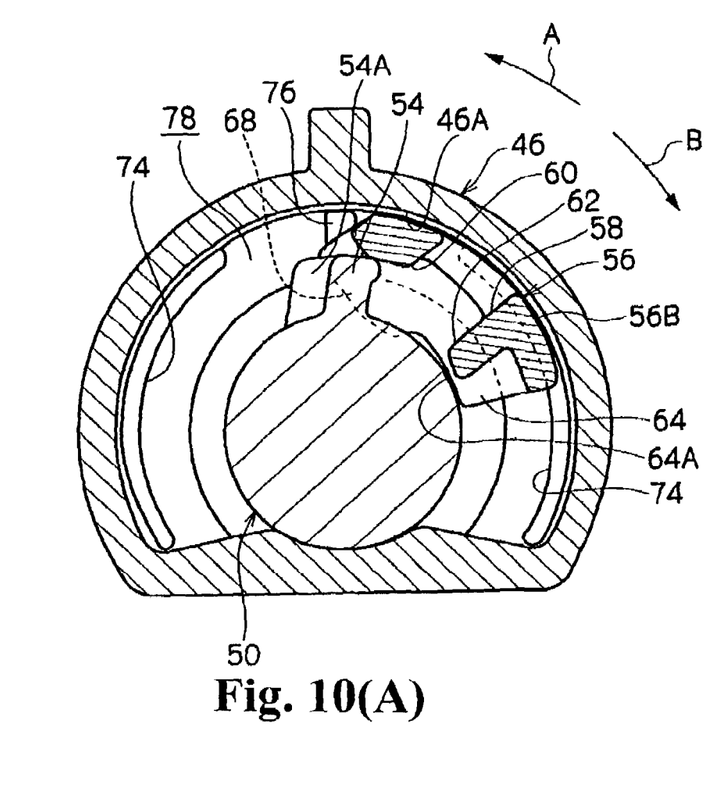
FIG. 10(A) is a sectional view of the rotor and the valve in the connected state.
Figure 10B:
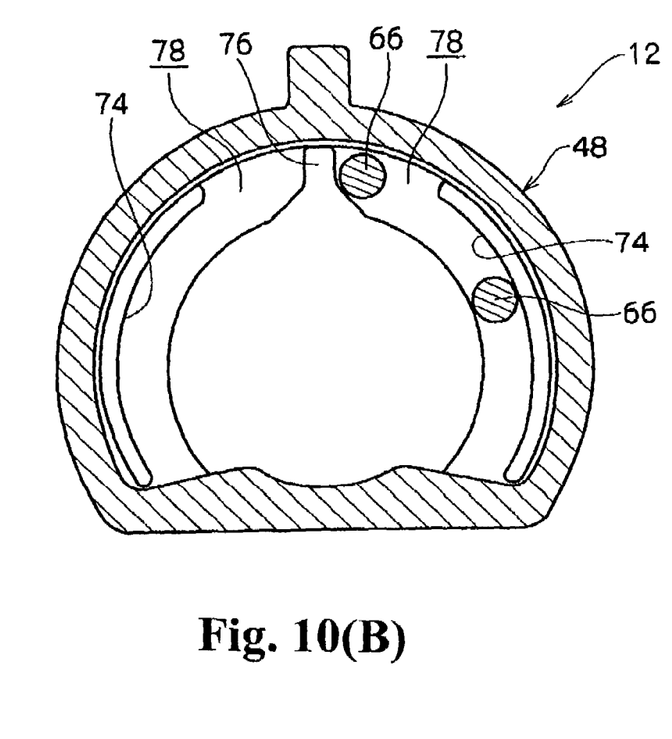
FIG. 10(B) is a sectional view showing a relationship between a guide groove formed in a cap and a pin of the valve.

Accordingly, when the hook 54 of the rotor 50 presses the steps 60 of the valve 56, as shown in FIG. 9 and FIGS. 10(A) and 10(B), it is possible to press the valve 56 against the inner surface 46A of the housing 46 in a inclined state relative to the circumferential direction of the rotor 50, so that the hook 54 can easily move over the steps 60.

In this state, the engaging parts 70 of the hook 50 are released from the lock piece 68 of the valve 56, and the rotor 50 is partially separated from the valve 56, thereby reducing torque applied to the rotor 50.

Figure 11A:
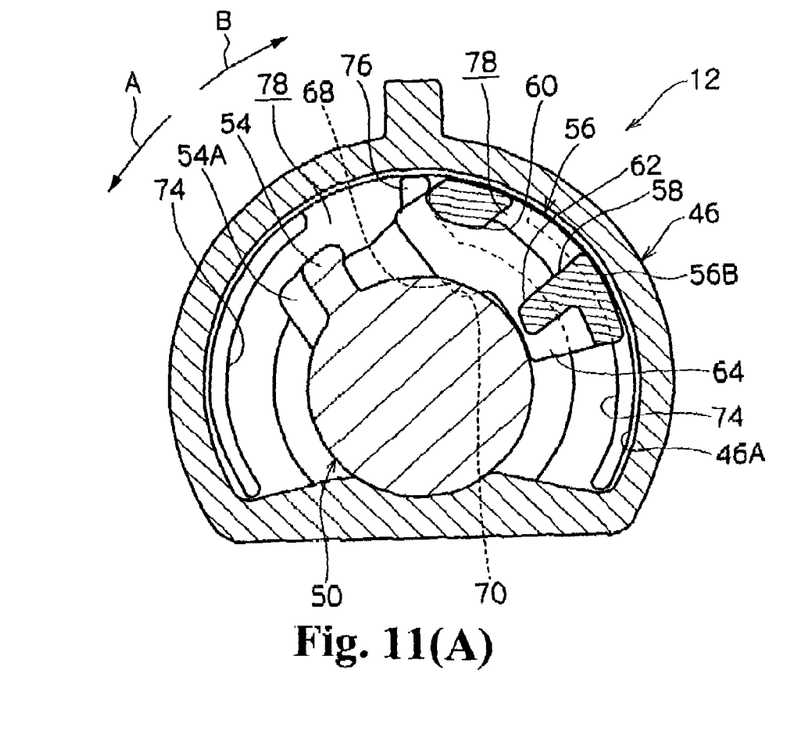
FIG. 11(A) is a sectional view of the rotor and the valve in the connected state.
Figure 11B:
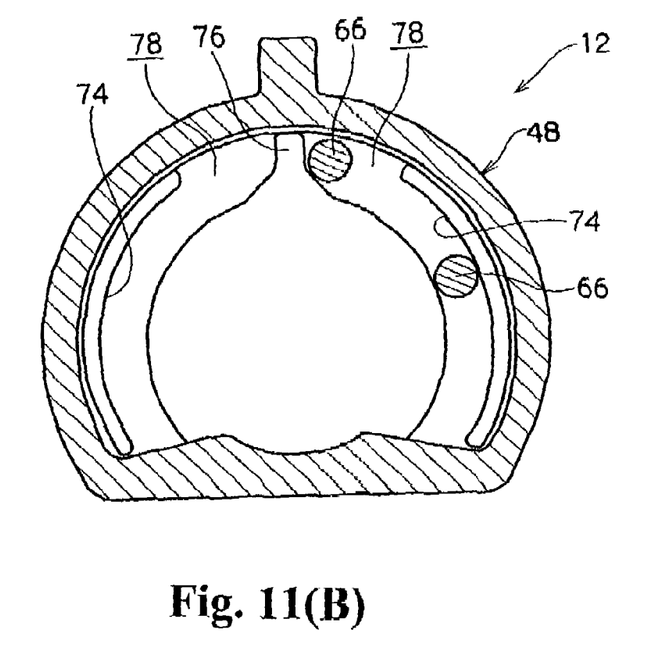
FIG. 11(B) is a sectional view showing a relationship between a guide groove formed in a cap and a pin of the valve.

As shown in FIGS. 11(A) and 11(B), when the pins 66 reach the stopper 76 of the guide grooves 76, the movement of the valve 56 is restricted. Accordingly, the rotor 50 is completely separated from the valve 56, and only the rotor 50 rotates, thereby reducing torque applied to the rotor 50.

In this state, when a hand is released from the operation handle 16, the operation handle 16 tries to return to the original position due to the restoring force of the coil spring 28. At this time, the gear 40 rotates through the arm 24 and rotates around its own axis through the sector gear 36 in the arrow direction A, so that the rotor 50 rotates in the arrow direction B.

When the rotor 50 reaches a position shown in FIGS. 10(A) and 10(B), the hook 54 of the rotor 50 contacts the valve 56. Accordingly, the valve 56 rotates with the wide parts 78 in a direction that the valve 56 is separated from the rotor 50.

Accordingly, the hook 54 of the rotor 50 moves over the steps 60 of the valve 56, and is positioned between the steps 60 and 62 as shown in FIGS. 8(A) and 8(B). The engaging parts 70 engage the lock pieces 68 of the valve 56, and the rotor 50 and the valve 56 are connected, so that the rotor 50 and the valve 56 rotate together.

The grooves 54A of the hook 54 of the rotor 50 are not formed on a side of the arrow direction B. Accordingly, when the rotor 50 rotates in the arrow direction B, viscous fluid pushed by the hook 54 does not move to the short hole 58 of the valve 56. As a result, when the rotor 50 rotates in the arrow direction B, it is possible to increase resistance of viscous fluid, thereby increasing torque applied to the rotor 50.

As shown in FIGS. 7(A) and 7(B), when the rotor 50 tries to return to the original position, a capacity of a liquid room 82 defined by the inner surface 46A of the hosing 46 and the valve 56 decreases, thereby increasing a compressive rate of viscous fluid. Accordingly, the rotor 50 and the valve 56 receive a reaction force due to compression of viscous fluid, thereby further increasing torque applied to the rotor 50.

As described above, according to the present invention, it is possible to significantly change torque according to the rotational direction of the rotor 50. When the operation handle 16 rotates in the arrow direction A, it is possible to reduce torque applied to the rotor 50, so that the operation handle 16 can rotate lightly with a small force. When a hand is released from the operation handle 16, it is possible to increase torque applied to the rotor 50, so that the operation handle 16 quietly returns to the original position, thereby providing high quality feeling.

In the present invention, the rotor 50 and the valve 56 are connected or completely separated from each other. The valve 56 is connected to or separated from the rotor 50 according to the rotational angle of the rotor 50, thereby changing torque applied to the rotor 50.

That is, when the rotor 50 and the valve 56 are connected, viscous fluid at a side of the inner surface 46A of the housing 46 passes through the gap between inner surface 46A of the housing 46 and the outer surface 56B of the valve 56. When the rotor 50 and the valve 56 are completely separated, viscous fluid passes through the gap between the inner surface 46A of the housing 46 and the outer surface 50A of the rotor 50, thereby significantly changing shear resistance applied to the rotor 50.

The rotor 50 is completely separated from the valve 56, and only the rotor 50 rotates, thereby significantly reducing torque applied to the rotor 50. When the rotor 50 and the valve 56 are connected or separated, torque applied to the rotor 50 is significantly changed. Accordingly, instead of gradually changing torque according to the rotational angle of the rotor 50, it is possible to set a specific point where torque is changed.

In the present invention, when the operation handle 16 rotates, the arm 24 rotates around the shaft 30. The gear 40 is disposed on the arm 24, and the sector gear 36 with teeth having a number greater than that of the gear 40 is fixed to the lock piece 20. Accordingly, the gear 40 rotates around the sector gear 36 and rotates around its won axis through the sector gear 36.

Accordingly, in the gear 40 and the sector gear 36, the sector gear 36 is formed of teeth having a number less than that of the gear 40, so that an angle speed of the sector gear 36 becomes greater than an angle speed of the gear 40. Accordingly, it is possible to rotate the rotor 50 in a larger extent, thereby effectively utilizing an effect of the damper 12.

The gear 40 and the sector gear 36 are formed as individual members attached to the arm 24or the shaft 30, respectively. Accordingly, it is possible to freely arrange the gear 40 and the sector gear 36 according to a function without restriction.

The gear 40 rotates around the sector gear 36, and rotates around its own axis through the sector gear 36. Alternatively, the sector gear 36 may rotate, and a rotational force may be transmitted to the gear 40.

In the present invention, when the operation handle returns to the closed position, the damper damps the operation handle, and the damper is not limited thereto. The damper is not limited to the door handle, and may be used for a globe compartment, Audio-Video equipment, and so on.

The disclosure of Japanese Patent Application No. 2004-017141, filed on Jan. 26, 2004, is incorporated in the application.

While the invention has been explained with reference to the specific embodiments of the invention, the explanation is illustrative and the invention is limited only by the appended claims.

What is claimed is:

1. A damper comprising:
   a housing with a cylindrical shape filled with viscous fluid,
   a rotor rotatably disposed in the housing for receiving a rotational force from outside,
   a valve arranged on the rotor for changing a position on the rotor to change torque applied to the rotor, and
   a connecting/separating device for changing the position of the valve relative to the rotor according to a rotational angle of the rotor,
   wherein said connecting/separating device comprises a hook formed on an outer surface of the rotor, a step formed on the valve to project inwardly therefrom for engaging with or separating from the hook, a pin formed on the valve to project outwardly along a longitudinal direction of the rotor, a guide groove formed in the housing for guiding the pin to move the valve around the rotor so that the position of the valve relative to the rotor is changed to change the torque applied to the rotor, and a stopper formed in the guide groove for restricting a movement of the pin.

2. A damper according to claim 1, wherein said valve further includes a hole at a center in a circumferential direction thereof, and said hook of the rotor includes a groove communicating with the hole when the rotor rotates in one direction in a state that the rotor engages the valve.

3. A damper according to claim 2, wherein said step includes a first step portion, and a second step portion situated away from the first step portion in a circumferential direction of the rotor and having a thickness toward the rotor greater than that of the first step portion.

4. A damper according to claim 3, wherein said hook has a height in radial direction of the rotor such that when the rotor is rotated, the hook can pass under the first step portion and is blocked by the second step portion.

5. A damper according to claim 1, wherein said valve and said rotor are arranged such that a distance between an inner surface of the housing and an outer surface, facing the inner surface, of the valve changes according to a position of the rotor in a circumference direction in a state that the rotor is connected to the valve.

6. A door handle comprising a handle mechanism and the damper according to claim 1 attached to the handle mechanism.

* * * * *